No. 802,175. PATENTED OCT. 17, 1905.
F. G. SEELEY & L. TOLCH.
CLUTCH AND CHANGEABLE SPEED AND REVERSING GEAR MECHANISM.
APPLICATION FILED MAY 2, 1904.
3 SHEETS—SHEET 1.
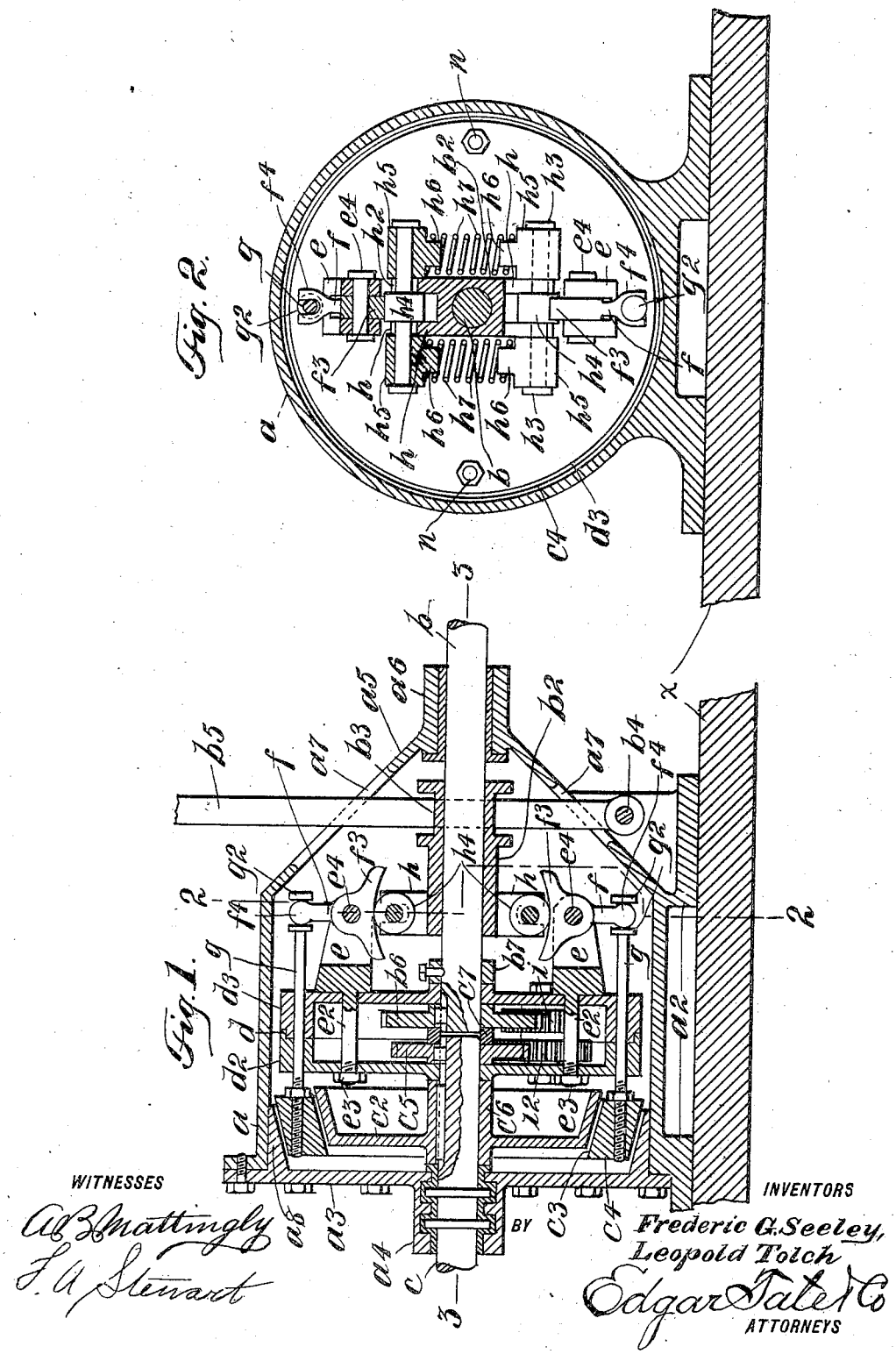
WITNESSES
AB Mattingly
S. A. Stewart
INVENTORS
Frederic G. Seeley,
Leopold Tolch
BY Edgar Tate & Co
ATTORNEYS

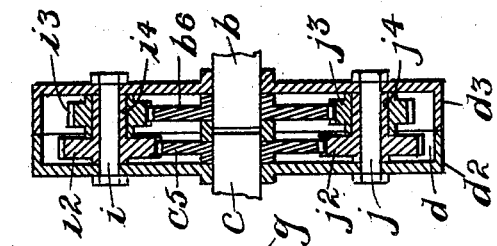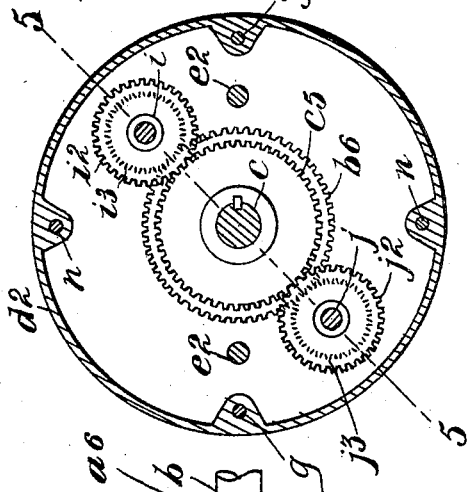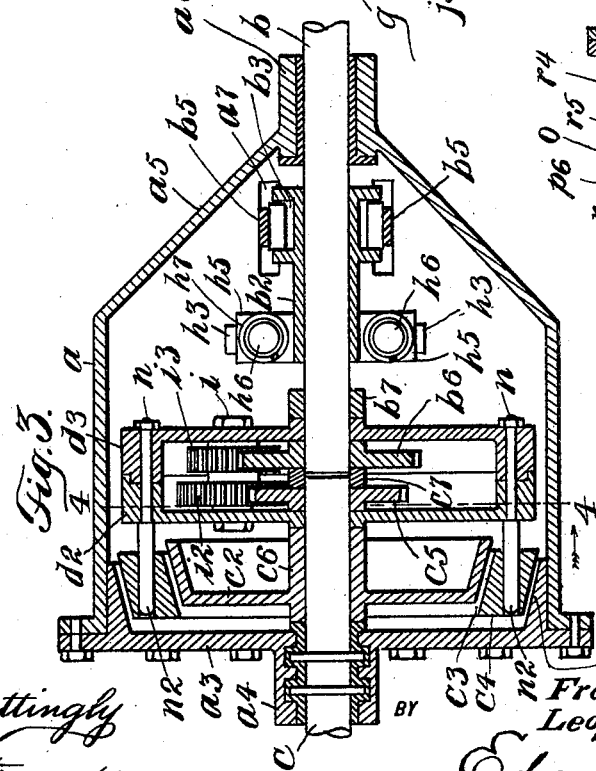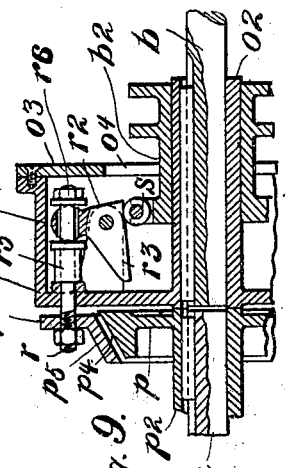

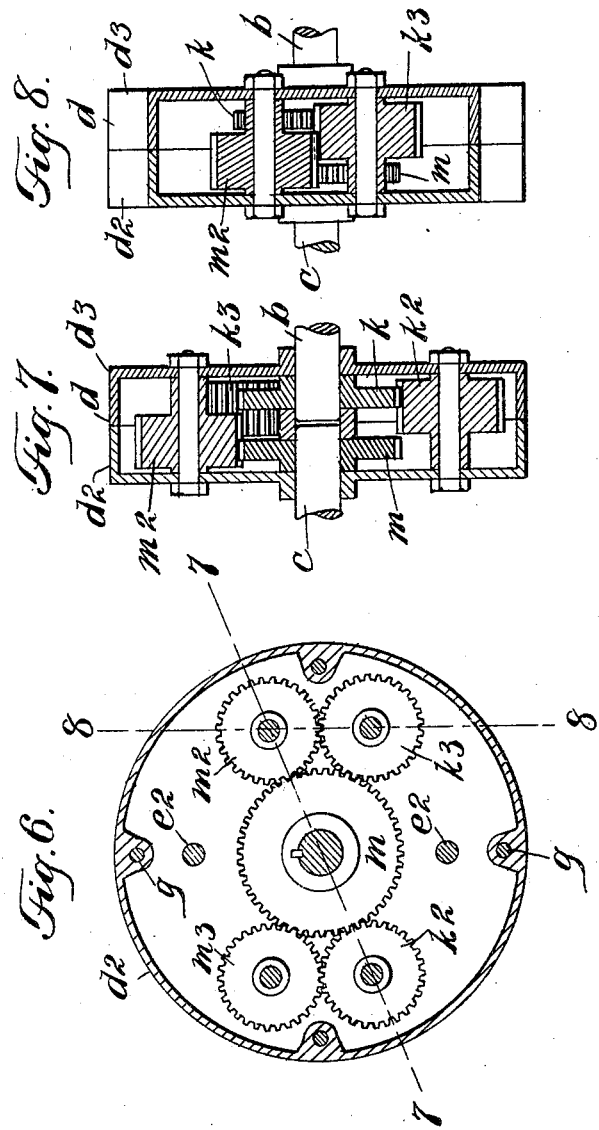

UNITED STATES PATENT OFFICE.

FREDERIC GEORGE SEELEY AND LEOPOLD TOLCH, OF LONDON, ENGLAND.

CLUTCH AND CHANGEABLE-SPEED AND REVERSING-GEAR MECHANISM.

No. 802,175.      Specification of Letters Patent.      Patented Oct. 17, 1905.

Application filed May 2, 1904. Serial No. 206,095.

*To all whom it may concern:*

Be it known that we, FREDERIC GEORGE SEELEY and LEOPOLD TOLCH, subjects of the King of Great Britain, residing at Fulham, London, S. W., England, have invented certain new and useful Improvements in Clutch and Changeable-Speed and Reversing-Gear Mechanism, of which the following is a specification, such as will enable those skilled in the art to which it appertains to make and use the same.

The object of this invention is to provide an improved clutch and changeable-speed and reversing-gear mechanism for transmitting the power of a driving-shaft to a driven shaft and for other purposes; and with this and other objects in view the invention consists in mechanism of the class specified constructed as hereinafter described and claimed.

The invention is fully disclosed in the following specification, of which the accompanying drawings form a part, in which the separate parts of our improvement are designated by suitable reference characters in each of the views, and in which—

Figure 1 is a sectional side view of our improved gear mechanism; Fig. 2, a cross-section on the line 2 2 of Fig. 1; Fig. 3, a section at right angles to that of Fig. 1, but showing only a portion of the parts; Fig. 4, a section of a gear-box on the line 4 4 of Fig. 3; Fig. 5, a section on the line 5 5 of Fig. 4; Fig. 6, a view similar to Fig. 4, but showing the reversing mechanism of our improved gear; Fig. 7, a section on the line 7 7 of Fig. 6; Fig. 8, a section on the line 8 8 of Fig. 6, and Fig. 9 a sectional side view of a modification illustrating a clutch mechanism independent of the changeable-speed and reversible gear.

In the practice of our invention we provide a box or casing $a$, which is cylindrical in cross-section in the form of construction shown and provided with a base $a^2$, by which it may be secured to any suitable support $x$. The box $a$ is provided with a left-hand end plate $a^3$, having a hub $a^4$, and a right-hand conical end portion $a^5$, having a hub $a^6$, and the conical end portion $a^5$ is provided at the top and bottom thereof with openings $a^7$. The driving-shaft $b$ passes through the hub $a^6$ of the conical end portion $a^5$ into the box $a$, and the driven shaft $c$ passes into the box $a$ through the hub $a^4$ of the end portion $a^3$ of said box. The box $a$ is also provided in the left-hand end portion thereof, and preferably formed integrally with the end portion $a^3$ of said box, with an annular cone-brake $a^8$, and secured to the inner end portion of the driven shaft $c$ is a cone-brake $c^2$, which is circular in form, and the bearing-surfaces of the brakes $a^8$ and $c^2$ are parallel, and between the same is an annular space $c^3$, in which is placed an annular double-cone brake $c^4$, the attachments and operation of which will be hereinafter described. Slidably mounted on the driving-shaft $b$ within the box $a$ is a sleeve $b^2$, provided at its outer end with a collar member $b^3$, and pivoted below the conical end portion of the box $a$, as shown at $b^4$, is a hand-lever $b^5$, which passes upwardly through the openings $a^7$ in the said conical end portion $a^5$ of the box $a$ and operates, in connection with the collar $b^3$ of the sleeve $b^2$, to move said sleeve longitudinally on the shaft $b$.

Mounted on the inner and adjacent ends of the shafts $b$ and $c$ is a gear-box $d$, composed of two parts $d^2$ and $d^3$, and keyed to the inner end of the driving-shaft $b$ is a gear-wheel $b^6$, and another wheel $c^5$ is keyed to the inner end of the driven shaft $c$, and the gear-box $d$ is held in proper position by means of a collar $b^7$, secured to the shaft $b$, and the hub $c^6$ of the cone-brake $c^2$, which is secured to the shaft $c$, and said wheels are separated by a collar $c^7$. Secured to the part $d^3$ of the gear-box $d$ and projecting approximately parallel with the shaft $b$ and at the opposite sides of said shaft, or in the same plane therewith, are forked arms $e$, which are provided with bolts $e^2$, which pass through the gear-box and are provided with nuts $e^3$, which hold the separate parts of the gear-box together, and mounted in the ends of the forked arms $e$ are bolts $e^4$, on which are pivoted levers $f$, the inner ends of which are provided with pivoted dogs $f^3$, having segmental inner faces, and the outer ends of which are provided with yoke or U-shaped heads $f^4$, and secured in the double-cone brake $c^4$ are rods $g$, which pass through the perimeter of the gear-box $d$ and are free to slide therethrough, and the ends of which adjacent to the levers $f$ are provided with collars or flanges $g^2$, between which the yoke or U-shaped portions $f^4$ of the levers $f$ operate.

The inner end of the sleeve $b^2$ is provided with oppositely-arranged and radially-projecting jaws or bearings $h$, having U-shaped recesses $h^2$, in which are mounted journals $h^3$, which range parallel with the shaft $b$, and said journals are provided centrally with rollers $h^4$, and the ends of the journals $h^3$ are provided with collars $h^5$, having inwardly-directed lugs or projections $h^6$, and between the collars $h^5$ are placed at each side of the sleeve $b^2$ springs $h^7$, and the pivoted dogs $f^3$ of the levers $f$ bear at all times on the rollers $h^4$, and said rollers and the journals $h^3$, on which they are mounted, have a slight radial movement with reference to the shaft $b$, said movement being controlled by the springs $h^7$.

Mounted in the gear-box $d$, as shown in Figs. 1 to 5, inclusive, and arranged radially with reference to the shafts $b$ and $c$ and diagonally of said box in the form of construction shown are two short shafts or journals $i$ and $j$, on which are mounted two gear-wheels $i^2$ and $i^3$ and $j^2$ and $j^3$. The wheel $b^6$ on the shaft $b$ in the form of construction shown is larger than the wheel $c^5$ on the shaft $c$, and the wheels $i^2$ and $j^2$ are larger than the wheels $i^3$ and $j^3$. The wheels $i^3$ and $j^3$ are also secured to the wheels $i^2$ and $j^2$, and in the form of construction shown this is done by providing the wheels $i^2$ and $j^2$ with hubs $i^4$ and $j^4$, on which the wheels $i^3$ and $j^3$ are secured. The wheels $i^3$ and $j^3$ mesh with the wheel $b^6$, and the wheels $i^2$ and $j^2$ mesh with the wheel $c^5$.

The foregoing construction constitutes our improved changeable gear, and the operation thereof is substantially as follows: If the shaft $b$ be turning in any direction and the hand-lever $b^5$ be operated so as to force the annular double-cone brake $c^4$ into connection with the annular cone-brake $a^8$, the gear-box $d$ will be locked to the casing $a$, and the shaft $c$ will be driven by the gearing in said box $d$ and at a higher rate of speed than the shaft $b$. If the hand-lever $b^5$ be moved so as to force the double-cone brake $c^4$ into connection with the cone-brake $c^2$, which is secured to the shaft $c$, the gear-box $d$ will be locked to the shaft $c$ and said shaft and all the connected parts will turn with the same speed as the shaft $b$.

It will be apparent that the wheels $i^2$ and $i^3$, operating in the gear-box $d$, would produce exactly the same result, as far as the turning of the shafts is concerned, as is produced by all the wheels in said gear-box, or, in other words, the wheels $j^2$ and $j^3$ are not absolutely necessary to secure the desired operation and are only employed for the purpose of balancing the parts and reducing friction.

In Figs. 6, 7, and 8 we have shown a modification of the gearing in the gear-box $d$ which enables us to reverse the direction of the movement of the shaft $c$, and in this form of construction the shafts $b$ and $c$ are provided with wheels $k$ and $m$, which are of the same size, and mounted in said gear-box are wheels $k^2$ and $m^2$, which mesh with the wheels $k$ and $m$, and other wheels $k^3$ and $m^3$, which mesh with the wheel $k$, and the wheels $k^2$ and $k^3$ also mesh with the wheels $m^2$ and $m^3$, and if the gear-box $d$ in Fig. 1 be provided with the gearing shown in Figs. 6 to 8, inclusive, and the hand-lever $b^5$ be manipulated so as to force the double annular cone-brake $c^4$ into connection with the annular cone-brake $a^8$ the gear-box will be locked to the casing and the direction of the shaft $c$ will be reversed, and if said hand-lever be moved so as to force the double-cone brake $c^4$ into connection with the cone-brake $c^2$ the two shafts will turn in the same direction and with the same speed.

In the construction shown in Figs. 1 to 5, inclusive, two of the rods $g$ are employed, and secured in the opposite sides of the gear-box $d$ are two other rods $n$, having enlarged portions $n^2$, which pass into the brake member $c^4$ and on which said brake member is movable, and these rods $n$ form guides for said brake member and aid the rods $g$ in holding said brake member in proper position.

It will be observed that the changeable-speed mechanism is exactly the same as the reversing mechanism, except as to the gearing in the gear-box $d$, and it will also be observed that the double arrangement of the wheels $k^2$, $k^3$, $m^2$, and $m^3$ in the reversing-gear mechanism shown in Figs. 6 to 8, inclusive, is, as in the case of the double arrangement of the gears shown in Figs. 4 and 5, for the purpose of counterbalancing the gear mechanism and for reducing the strain and consequent friction; but the same operation of the parts may of course be produced by employing either the wheels $k^2$ and $m^3$ or $k^3$ and $m^2$ in this form of construction.

Our invention is particularly adapted for use in propeller-driven boats and vessels; but the same may be employed wherever changeable-speed gears and reversing-gears are desired in the operation of a driving and a driven shaft.

Although we have shown and described a stationary box or casing into which the shafts $b$ and $c$ extend and in which the movable and operative parts of our improved mechanism are located, our invention is not limited to this box or casing, and any suitable frame or support may be employed, said frame or support being adapted to hold the shafts $b$ and $c$ and being provided with the stationary brake member $a^8$; but we prefer the use of the box or casing $a$, for the reason that it protects the operative mechanism and prevents interference therewith.

In Fig. 9 we have shown a form of construction which involves the omission of the gear-box and by means of which we provide a simple and effective clutch for transmitting the movement of the driving-shaft $b$ to the driven shaft $c$, and in this form of construction a casing $o$, having a central elongated hub $o^2$, is keyed to the shaft $b$ and sleeve $b^2$ is mounted on the hub $o^2$ and free to slide thereon. The casing $o$ is open at the right-hand side or end thereof and is provided with a removable plate $o^3$, having a central opening $o^4$, through which the sleeve $b^2$ is free to move, and the end of the shaft $c$ is provided with a friction clutch-wheel $p$, the hub $p^2$ of which is keyed to said shaft $c$, and the wheel $p$ is provided with a conical rim $p^4$, and employed in connection therewith is a clutch-band $p^5$, having a conical or inclined inner surface adapted to operate on the corresponding surface of the wheel $p$. Passing through the end of the casing $o$ adjacent to the wheel $p$ are a plurality of bolts $r$, only one of which is shown, and these bolts are connected with a flange or rim $p^6$ on the clutch-band $p^5$. Pivotally supported in the casing $o$ are dogs $r^2$, which correspond with the dogs $f^3$ shown in Fig. 1, and but one of which is shown, and these dogs have projections $r^3$, which extend in the direction of the left-hand end or side of the casing $o$, and said dogs are also provided with radially and outwardly directed heads $r^4$, through which the bolts $r$ pass, and the bolts $r$ are provided with a collar $r^5$ and a nut $r^6$, which holds the heads of the dogs $r^2$ in proper position on the bolts $r$. The sleeve $b^2$ in this form of construction is provided with antifriction-rollers $s$, but one of which is shown, and the dogs $r^2$ are provided with straight inner surfaces, which bear on the rollers $s$, and the movement of the sleeve $b^2$ outwardly or to the right into the position shown in Fig. 9 will throw the clutch-band $p^5$ out of connection with the wheel $p$, and the movement of said sleeve to the left will throw said clutch-band into connection with said wheel, and in this way the movement of the shaft $b$ may be transmitted to the shaft $c$ whenever desired.

It will also be seen that by omitting the gearing in the gear-box shown in Figs. 1 and 3 the construction shown in said figures may also be employed for the same purpose as the construction shown in Fig. 9, and it will also be apparent that the arms $e$, which support the dogs $f^3$ in the construction shown in Figs. 1 and 3, may be connected with the gear-box $d$ in any desired manner and may be formed integrally with one part thereof, if desired.

The clutch mechanism shown in Fig. 9 and herein described is not claimed in this case, but is made the subject of a separate application filed on the 10th day of November, 1904, Serial No. 232,099.

Having fully described our invention, what we claim as new, and desire to secure by Letters Patent, is—

1. In an apparatus of the class described, a stationary casing, a driving-shaft passing into one end thereof, a driven shaft passing into the other end thereof, a gear-box loosely mounted on the inner ends of said shafts, a gear-wheel secured to the inner end of each of said shafts within the said box, other gearing in said box and supported thereby and by which the last-named wheels are connected, an annular clutch member secured to said casing at the end through which the driven shaft passes, a circular clutch member secured to the driven shaft within said casing, an annular member mounted between said clutch members and adapted to operate in connection with both, and means for moving the annular brake member toward and from the gear-box and securing it thereto, substantially as shown and described.

2. In an apparatus of the class described, a stationary casing a driving-shaft passing into one end thereof, a driven shaft passing into the other end thereof, a gear-box loosely mounted on the inner ends of said shafts, a gear-wheel secured to the inner end of each of said shafts within the said box, other gearing in said box and supported thereby and by which the last-named wheels are connected, an annular clutch member secured to said casing at the end through which the driven shaft passes, a circular clutch member secured to the driven shaft within said casing, an annular brake member mounted between the said clutch members and adapted to operate in connection with both, and means for moving the annular brake member toward and from the gear-box and securing it thereto, consisting of a sleeve mounted on the driving-shaft, means for moving said sleeve longitudinally of said shaft, rods secured to the annular brake member and passing through the perimeter of the gear-box, and devices operating in connection with said rods and operated by said sleeve to move the rods connected with the annular brake member, substantially as shown and described.

3. In an apparatus of the class described, a stationary casing, a driving-shaft passing into one end thereof, a driven shaft passing into the other end thereof, a gear-box mounted on the inner ends of said shafts and turnable thereon, gear-wheels secured to the inner ends of said shafts within said box, other gear-wheels mounted in and supported by said box and whereby the first-named gear-wheels are connected, a stationary annular clutch member within said casing and at the end thereof into which the driven shaft passes, a circular clutch member secured to the inner end portion of the driven shaft within said casing, an annular brake member mounted between said clutch members and adapted to operate in connection with both, a sleeve mounted on the driving-shaft and the inner end of which is provided with oppositely-arranged roller-supports connected with the gear-box, levers connected with said supports and provided with segmental dogs which operate in connection with said rollers, and rods connected with the annular brake member and passing through the perimeter of the gear-box and adapted to be operated by said levers, and means for moving said sleeve on the driving-shaft, substantially as shown and described.

4. In an apparatus of the class described, a stationary support, a driving-shaft passing into one end thereof, a driven shaft passing into the other end thereof, a gear-box loosely mounted on the inner ends of said shafts, a gear-wheel secured to the inner end of each of said shafts within said gear-box, other gearing in said box and supported thereby and by which the last-named wheels are connected, an annular clutch member secured to said support at the end thereof, through which the driven shaft passes, a circular clutch member secured to the driven shaft, an annular brake member mounted between said clutch members and adapted to operate in connection with both, and means for moving the annular brake member toward and from the gear-box and securing it thereto, substantially as shown and described.

In testimony that we claim the foregoing as our invention we have signed our names, in presence of the subscribing witnesses, this 18th day of April, 1904.

FREDERIC GEORGE SEELEY.
LEOPOLD TOLCH.

Witnesses:
H. D. JAMESKY,
F. L. RAND.